US010985955B2

(12) United States Patent
Chen et al.

(10) Patent No.: US 10,985,955 B2
(45) Date of Patent: Apr. 20, 2021

(54) METHOD FOR AUTOMATICALLY IDENTIFYING MODULATION MODE FOR DIGITAL COMMUNICATION SIGNAL

(71) Applicant: SOUTH CHINA UNIVERSITY OF TECHNOLOGY, Guangdong (CN)

(72) Inventors: Fangjiong Chen, Guangdong (CN); Wensong Zhang, Guangdong (CN); Zeng Hu, Guangdong (CN); Fei Ji, Guangdong (CN); Hua Yu, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/498,391

(22) PCT Filed: Nov. 30, 2017

(86) PCT No.: PCT/CN2017/114108
§ 371 (c)(1),
(2) Date: Sep. 27, 2019

(87) PCT Pub. No.: WO2018/176889
PCT Pub. Date: Oct. 4, 2018

(65) Prior Publication Data
US 2020/0044899 A1    Feb. 6, 2020

(30) Foreign Application Priority Data
Mar. 27, 2017 (CN) .......................... 201710189632.0

(51) Int. Cl.
*H04L 27/00* (2006.01)
*G06K 9/62* (2006.01)
*G06N 3/08* (2006.01)

(52) U.S. Cl.
CPC ........ *H04L 27/0012* (2013.01); *G06K 9/6269* (2013.01); *G06N 3/084* (2013.01)

(58) Field of Classification Search
CPC ... H04L 27/0012; G06N 3/084; G06K 9/6269
See application file for complete search history.

(56) References Cited

U.S. PATENT DOCUMENTS 6,240,282 B1 *  5/2001  Kleider ............... H04L 27/0012
                                                    375/285
6,466,614 B1 * 10/2002  Smith ...................... H04B 3/46
                                                    375/224

(Continued)

FOREIGN PATENT DOCUMENTS

CN    102710572    10/2012
CN    104994045    10/2015

(Continued)

OTHER PUBLICATIONS

Wang Xin et al., "Primary User Signal Recognition Algorithm based on Random Forest in Cognitive Network", Journal of Northeastern University (Natural Science), vol. 35, No. 12, Dec. 2014, pp. 1706-1709.

(Continued)

*Primary Examiner* — Jean B Corrielus
(74) *Attorney, Agent, or Firm* — JCIPRNET (57) ABSTRACT

The invention provides a method for automatically identifying a modulation mode for a digital communication signal. The method comprises the following steps of: S1: preprocessing a training digital modulation signal; S2: extracting a characteristic value of the training digital modulation signal; S3: constructing a strong classifier by Bagging learning; and S4: preprocessing a modulation signal to be tested and extracting a corresponding characteristic parameter, and then inputting the characteristic parameter into the strong classifier in the S3 to classify and identify the modulation (Continued)

signal. According to the method, by processing all characteristic values in parallel, a success rate of identification has little to do with an identification performance of a single characteristic parameter and is mainly related to an overall performance, so that the identification to the modulation mode has the advantages of fast identification speed and high success rate of identification.

4 Claims, 4 Drawing Sheets

(56) References Cited

U.S. PATENT DOCUMENTS

| | | | |
|---|---|---|---|
| 6,690,746 B1 * | 2/2004 | Sills | G06K 9/00523 375/316 |
| 6,934,342 B1 * | 8/2005 | Ishii | H04L 27/0012 375/316 |
| 10,003,483 B1 * | 6/2018 | Migliori | G06N 3/0454 |
| 2011/0103454 A1 * | 5/2011 | Bose | H04L 25/0307 375/232 |
| 2012/0257829 A1 * | 10/2012 | Fam | H04L 27/0006 382/171 |

FOREIGN PATENT DOCUMENTS

| | | |
|---|---|---|
| CN | 107124381 | 9/2017 |
| WO | 2016138238 | 9/2016 |

OTHER PUBLICATIONS

Zhu Shou-Ye, "Intrusion detection based on BP neural network and Bagging method", Computer Engineering and Applications, 2009,45(18), Jun. 2009, pp. 123-125 and 128.

Lin Jinfu et al., "Novel Modulation Recognition Algorithm Based on Boosting Feature Selection", Wide Band Network-Video Engineering, vol. 37, No. 15, Aug. 2013, pp. 90-92 and132.

"International Search Report (Form PCT/ISA/210) of PCT/CN2017/114108," dated Jan. 30, 2018, with English translation thereof, pp. 1-6.

* cited by examiner

METHOD FOR AUTOMATICALLY IDENTIFYING MODULATION MODE FOR DIGITAL COMMUNICATION SIGNAL

CROSS-REFERENCE TO RELATED APPLICATION

This application is a 371 of international application of PCT application serial no. PCT/CN2017/114108, filed on Nov. 30, 2017, which claims the priority benefit of China application no. 201710189632.0, filed on Mar. 27, 2017. The entirety of each of the above mentioned patent applications is hereby incorporated by reference herein and made a part of this specification.

BACKGROUND

Technical Field

The present invention relates to the fields of mode identification, machine learning and digital communication, and more particularly, to a method for automatically identifying a modulation mode for a digital communication signal.

Description of Related Art

The purpose of communication is to effectively, safely and accurately transmit information by a channel. Regardless of wired communication or wireless communication, due to channel limitations, and in order to make full use of the capacity of the channel and meet different needs of users, all baseband signals cannot be directly transmitted and must be modulated. Through modulation, the signal can be transmitted more safely, and a higher communication rate and a more effective spectrum utilization rate can also be obtained. With rapid development of electronic technology and continuous improvement of information transmission requirements, there are more and more modulation modes for communication signals. At present, various modulation modes are applied in a communication system, and the signals are modulated to different frequency bands for transmission. In specific application, we encounter not only cooperative communication problems, but also non-cooperative communication problems. Cooperative communication is usually used in most civil communications, i.e., a modulation mode and a modulation parameter of a transmission signal are known in advance, and a receiver only needs to demodulate received information according to the modulation mode and the modulation parameter given in advance. However, a receiving end may receive all kinds of signals, after all, in today's highly developed communication signals, the signals in the surrounding space are complex and various, how to extract a signal to be really received from the receiving end is also an important problem, one method is to identify the received signal, obtain its modulation mode and its modulation parameter, and then compare the signal with a signal given in advance, and if the signal is determined to be from a sending end, the signal is received and demodulated. Meanwhile, all software radio receivers have realized automatic reception of multi-band and multi-modulation signals at present, and it is also necessary to identify the modulation mode and the signal parameter of the signal before receiving the signal correctly. Therefore, automatic identification of the modulation mode of the communication signal is widely used in civil communication.

In April 1969, four authors including C. S. Waver published the first paper "Automatic Classification of Modulation Types Using Mode Identification Technology" about a research on automatic modulation identification in the technical report of Stanford University. Since then, the research on automatic identification of modulation signal at home and abroad has entered a vigorous development stage, and a system has been gradually improved. Polydoros did a lot of research works in the field of decision theory and method of modulation identification, which were mainly used for classification of CW, MPSK and MFSK signals. J. A. Sills proposed to use a maximum likelihood method to classify PSK signals and QAM signals, and Wen Wei proposed to use the maximum likelihood method to realize QAM modulation classification of signals. Hsue proposed to use a histogram between time intervals of zero crossing points of signals and phase differences to classify signals. In 1992, Assaleh proposed a classification method for the digital modulation signal by using an AR model to extract an instantaneous frequency and an instantaneous bandwidth of a signal as characteristic parameters, and CW, MPSK and MFSK signals could be classified according to the method. A. K. Nandi and E. E. Azzouz used nine key characteristics proposed by them to classify and identify analog and digital signals using the methods of decision theory, neural network and neural network cascade respectively, and when a signal-to-noise ratio was greater than 10 dB, a good identification effect was achieved. In recent years, researchers have combined machine learning, neural network technology, wavelet transform technology, high-level spectrum analysis technology and modulation identification technology, and proposed many new modulation identification methods. The application of the machine learning in the automatic identification of the modulation mode for the digital communication signal has received extensive attention.

SUMMARY

The present invention is intended to provide a method for automatically identifying a modulation mode for a digital communication signal, which is used for identifying six types of commonly used digital communication modulation signals, respectively comprising 2ASK, 4ASK, 2FSK, 4FSK, 2PSK and 4PSK. A machine learning method based on concurrent integrated learning is applied to identify a modulation mode for a digital signal according to the present invention. The six types of digital communication modulation signals can be more accurately identified according to the present invention.

The object of the present invention is achieved by the following technical solutions.

A method for automatically identifying a modulation mode for a digital communication signal comprises following steps.

S1. Preprocessing a training digital modulation signal, a signal preprocessing part providing suitable data for subsequent processing, and the signal preprocessing comprising: estimating a bandwidth and a carrier frequency of the unknown signal, performing band-pass filtering on the signal, and converting the signal to an appropriate frequency band.

S2. Extracting a characteristic value of the training digital modulation signal, and extracting a signal time domain characteristic from the digital modulation signal, comprising:

(1) a maximum value $\gamma_{max}$ of a normalized center instantaneous amplitude spectrum $$\gamma_{max} = \max |FFT[a_{cn}(i)]|^2 / N_s$$

$$a_{cn}(i) = a_n(i) - 1,$$

wherein $N_s$ is a number of sampling points, $a_{cn}(i)$ is a zero-center normalized instantaneous amplitude, $$a_n(i) = \frac{a(i)}{m_s}, \quad m_s = \frac{1}{N_s} \sum_{i=1}^{N_s} a(i)$$

is an average value of the instantaneous amplitude $a(i)$, and a purpose of normalizing the instantaneous amplitude with the average value is to eliminate an effect of channel gains;

(2) a standard deviation $\sigma_{ap}$ of an absolute value of a nonlinear component of an instantaneous phase of a zero-center non-weak signal segment $$\sigma_{ap} = \sqrt{\frac{1}{c}\left[\sum_{a_n(i)>a_t} \phi_{NL}^2(i)\right] - \left[\frac{1}{c}\sum_{a_n(i)>a_t} |\phi_{NL}(i)|\right]^2},$$

wherein $a_t$ is an amplitude decision threshold level for judging a weak signal, c is a number of all sampled data $N_s$ belonging to a non-weak signal value, and $\phi_{NL}(i)$ is the nonlinear component of the instantaneous phase after zero-center processing; and when carrier waves are completely synchronized, $$\phi_{NL}(i) = \varphi(i) - \varphi_0,$$

wherein $$\varphi_0 = \frac{1}{N_s}\sum_{i=1}^{N_s} \varphi(i),$$

and $\varphi(i)$ is the instantaneous phase;

(3) a standard deviation $\sigma_{dp}$ of the nonlinear component of he instantaneous phase of the zero-center non-weak signal segment $$\sigma_{dp} = \sqrt{\frac{1}{c}\left[\sum_{a_n(i)>a_t} \phi_{NL}^2(i)\right] - \left[\frac{1}{c}\sum_{a_n(i)>a_t} \phi_{NL}(i)\right]^2};$$

(4) a standard deviation $\sigma_{aa}$ of an absolute value of the zero-center normalized instantaneous amplitude $$\sigma_{aa} = \sqrt{\frac{1}{N_s}\left[\sum_{i=1}^{N_s} a_{cn}^2(i)\right] - \left[\frac{1}{N_s}\sum_{i=1}^{N_s} |a_{cn}(i)|\right]^2},$$

wherein a definition equation of $a_{cn}(i)$ has been given above; and (5) a standard deviation $\sigma_{af}$ of an absolute value of an instantaneous frequency of a zero-center normalized non-weak signal segment $$\sigma_{af} = \sqrt{\frac{1}{c}\left[\sum_{a_n(i)>a_t} f_N^2(i)\right] - \left[\frac{1}{c}\sum_{a_n(i)>a_t} f_N(i)\right]^2},$$

wherein $$f_N(i) = \frac{f_m(i)}{R_s}, \quad f_m(i) = f(i) - m_f, \quad m_f = \frac{1}{N_s}\sum_{i=1}^{N_s} f(i),$$

$R_s$ is a symbol rate of the digital signal, and $f(i)$ is an instantaneous frequency of the signal.

S3. Training a strong classifier, and training five weak classifiers based on a BP neural network through Bagging concurrent integrated learning, then combining the weak classifiers into the strong classifier, and a specific step comprises as follows.

S31. Setting a data set $G=\{(x_1,y_1), \ldots, (x_{1000},y_{1000})\}$ containing 1000 training samples, wherein $x_i=[\gamma_{max}, \sigma_{ap}, \sigma_{aa}, \sigma_{af}]^T$ ($i \in \{1, 2, \ldots, 1000\}$), and $y_i$ belongs to one column of the following matrixes:

$$Y = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

wherein a first column represents a 2ASK modulation mode, a second column represents a 4ASK modulation mode, a third column represents a 2FSK modulation mode, a fourth column represents a 4FSK modulation mode, a fifth column represents a 2PSK modulation mode, and a sixth column represents a 4PSK modulation mode.

S32. Randomly taking a sample from the data set of the training samples and placing the sample into a sampling set, then placing the sample back into the data set of the initial training samples, so that the sample is possibly selected in next sampling, thus obtaining a sampling set $D_t$ containing 1000 samples after 1000 times of random sampling operations; and similarly, sampling five sampling sets containing 1000 training samples.

S33. Training a three-layer BP neural network called as a weak classifier for each sampling set $D_t$, wherein, a column vector input is used for an input of the network, i.e., $x_i=[\gamma_{max}, \sigma_{ap}, \sigma_{aa}, \sigma_{af}]^T$, and a column vector output is used for an output of the network, i.e., $y_i$, so as to obtain the weak classifier corresponding to each sampling set, and a decision function is $h_t(x)$; and the BP neural network is composed of an input layer, a hidden layer and an output layer.

S34. Obtaining the strong classifier by combining the weak classifiers, wherein an overall decision function is:

$$H(x) = \underset{y \in Y}{\operatorname{argmax}} \sum_{t=1}^{5} I(h_t(x) = y),$$

wherein x is an input vector, y is an output vector, I(•) is an indicator function, and when • is true and false, values 1 and 0 are respectively taken.

S4. Testing the model, wherein a digital modulation signal to be tested is preprocessed firstly and a corresponding characteristic value is extracted, and then the characteristic value is inputted into the strong classifier in the step 3 to classify and identify the modulation mode; when a predicted output of each weak classifier is combined, a simple voting method is used to obtain a classification result by a rule that the minority obeys the majority.

After employing the technical solutions above, the present invention has the following advantages and technical effects.

1. According to the method, five commonly used characteristic values are identified as the input of the strong classifier by the digital signal modulation mode, and all characteristic values are used in each decision instead of using only one characteristic value, a success rate of identification is mainly related to an overall performance of a characteristic, and compared with the traditional method of using one characteristic quantity to make decision, the method has the higher success rate of identification.

2. An intelligent degree is high, no prior knowledge is needed, and it is only needed to train the samples and adjust a structure of the classifier, so that the modulation mode can be identified.

DESCRIPTION OF THE EMBODIMENTS

The present application is further described in detail below with reference to the accompanying drawings and the specific embodiments.

Figure 1:
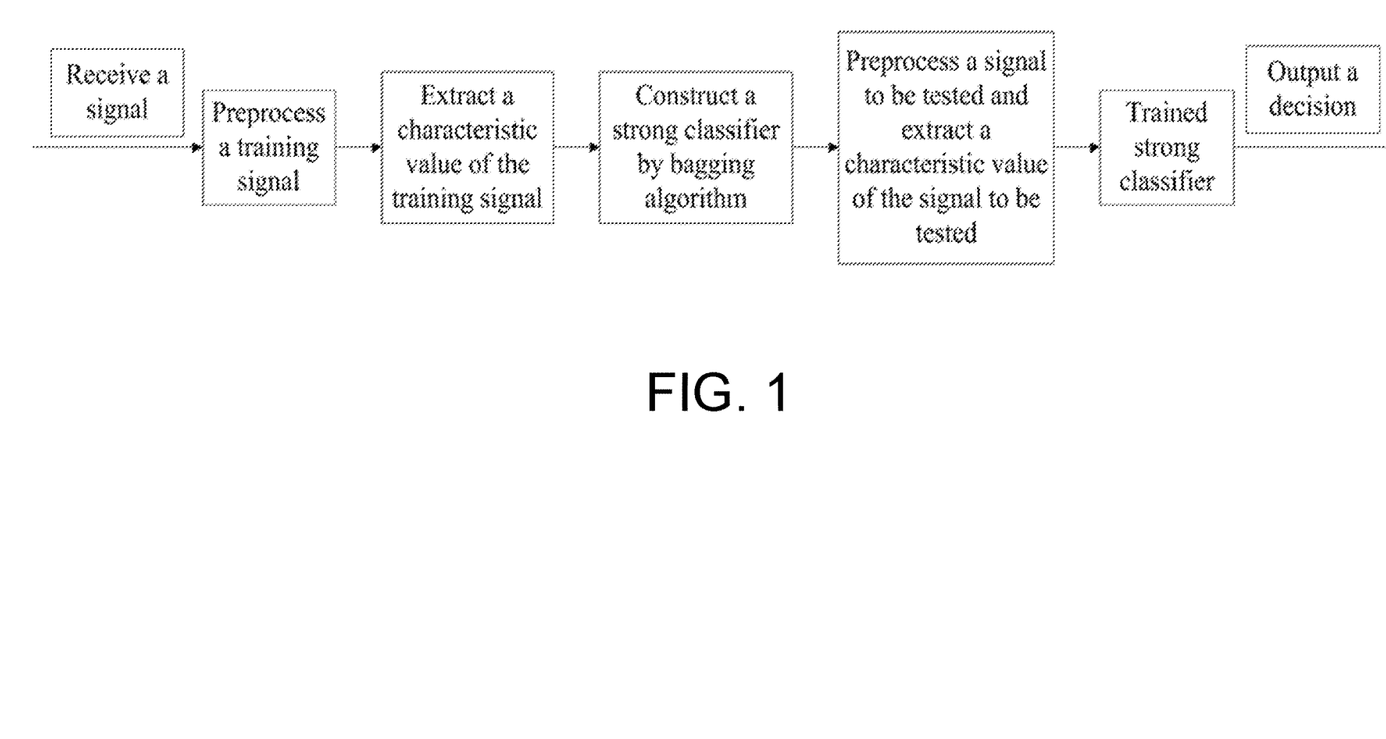
FIG. 1 is a flow chart of steps of a method for automatically identifying a modulation mode for a digital communication signal according to the present invention.
Figure 2:
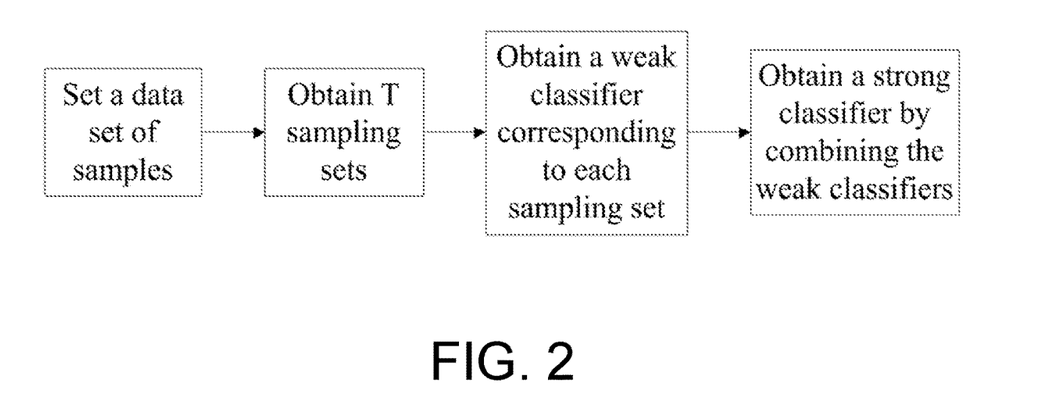
FIG. 2 is a flow chart of steps of training a strong classifier in the method for automatically identifying a modulation mode for a digital communication signal according to the present invention.

The embodiment provides a method for automatically identifying a modulation mode for a digital communication signal, as shown in FIG. 1, comprising the following steps.

S1. Preprocessing a training digital modulation signal, a signal preprocessing part providing suitable data for subsequent processing, and the signal preprocessing comprising: estimating a bandwidth and a carrier frequency of the unknown signal, performing band-pass filtering on the signal, and converting the signal to an appropriate frequency band.

S2. Extracting a characteristic value of the training digital modulation signal, and extracting a signal time domain characteristic from the digital modulation signal, comprising:

(1) a maximum value $\gamma_{max}$ of a normalized center instantaneous amplitude spectrum $$\gamma_{max} = \max|FFT[a_{cn}(i)]|^2/N_s$$

$$a_{cn}(i) = a_n(i) - 1,$$

wherein $N_s$ is a number of sampling points, $a_{cn}(i)$ is a zero-center normalized instantaneous amplitude, $$a_n(i) = \frac{a(i)}{m_s}, \quad m_s = \frac{1}{N_s}\sum_{i=1}^{N_s} a(i)$$

is an average value of the instantaneous amplitude a(i), and a purpose of normalizing the instantaneous amplitude with the average value is to eliminate an effect of channel gains;

(2) a standard deviation $\sigma_{ap}$ of an absolute value of a nonlinear component of an instantaneous phase of a zero-center non-weak signal segment $$\sigma_{ap} = \sqrt{\frac{1}{c}\left[\sum_{a_n(i)>a_t} \phi_{NL}^2(i)\right] - \left[\frac{1}{c}\sum_{a_n(i)>a_t} |\phi_{NL}(i)|\right]^2},$$

wherein $a_t$ is an amplitude decision threshold level for judging a weak signal, c is a number of all sampled data $N_s$ belonging to a non-weak signal value, and $\phi_{NL}(i)$ is the nonlinear component of the instantaneous phase after zero-center processing; and when carrier waves are completely synchronized, $$\phi_{NL}(i) = \varphi(i) - \varphi_0,$$

wherein $$\varphi_0 = \frac{1}{N_s}\sum_{i=1}^{N_s} \varphi(i),$$

and φ(i) is the instantaneous phase;

(3) a standard deviation $\sigma_{dp}$ of the nonlinear component of the instantaneous phase of the zero-center non-weak signal segment $$\sigma_{dp} = \sqrt{\frac{1}{c}\left[\sum_{a_n(i)>a_t} \phi_{NL}^2(i)\right] - \left[\frac{1}{c}\sum_{a_n(i)>a_t} \phi_{NL}(i)\right]^2};$$

(4) a standard deviation $\sigma_{aa}$ of an absolute value of the zero-center normalized instantaneous amplitude $$\sigma_{aa} = \sqrt{\frac{1}{N_s}\left[\sum_{i=1}^{N_s} a_{cn}^2(i)\right] - \left[\frac{1}{N_s}\sum_{i=1}^{N_s} |a_{cn}(i)|\right]^2},$$

wherein a definition equation of $\sigma_{cn}(i)$ has been given above; and (5) a standard deviation $\sigma_{af}$ of an absolute value of an instantaneous frequency of a zero-center normalized non-weak signal segment $$\sigma_{af} = \sqrt{\frac{1}{c}\left[\sum_{a_n(i)>a_t} f_N^2(i)\right] - \left[\frac{1}{c}\sum_{a_n(i)>a_t} f_N(i)\right]^2},$$

wherein $$f_N(i) = \frac{f_m(i)}{R_s}, f_m(i) = f(i) - m_f, m_f = \frac{1}{N_s}\sum_{i=1}^{N_s} f(i),$$

$R_s$ is a symbol rate of the digital signal, and f(i) is an instantaneous frequency of the signal.

S3. Training a strong classifier, and training five weak classifiers based on a BP neural network through Bagging concurrent integrated learning, then combining the weak classifiers into the strong classifier, and a specific step comprises as follows.

S31. Setting a data set G={(x$_1$,y$_1$), . . . , (x$_{1000}$,y$_{1000}$)} containing 1000 training samples, wherein $x_i = [\gamma_{max_i}, \sigma_{ap_i}, \sigma_{aa_i}, \sigma_{af_i}]^T$ (i∈{1, 2, . . . , 1000}), and y$_i$ belongs to one column of the following matrixes:

$$Y = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

wherein a first column represents a 2ASK modulation mode, a second column represents a 4ASK modulation mode, a third column represents a 2FSK modulation mode, a fourth column represents a 4FSK modulation mode, a fifth column represents a 2PSK modulation mode, and a sixth column represents a 4PSK modulation mode.

S32. Randomly taking a sample from the data set of the training samples and placing the sample into a sampling set, then placing the sample back into the data set of the initial training samples, so that the sample is possibly selected in next sampling, thus obtaining a sampling set D$_t$ containing 1000 samples after 1000 times of random sampling operations; and similarly sampling five sampling sets containing 1000 training samples.

Figure 3:
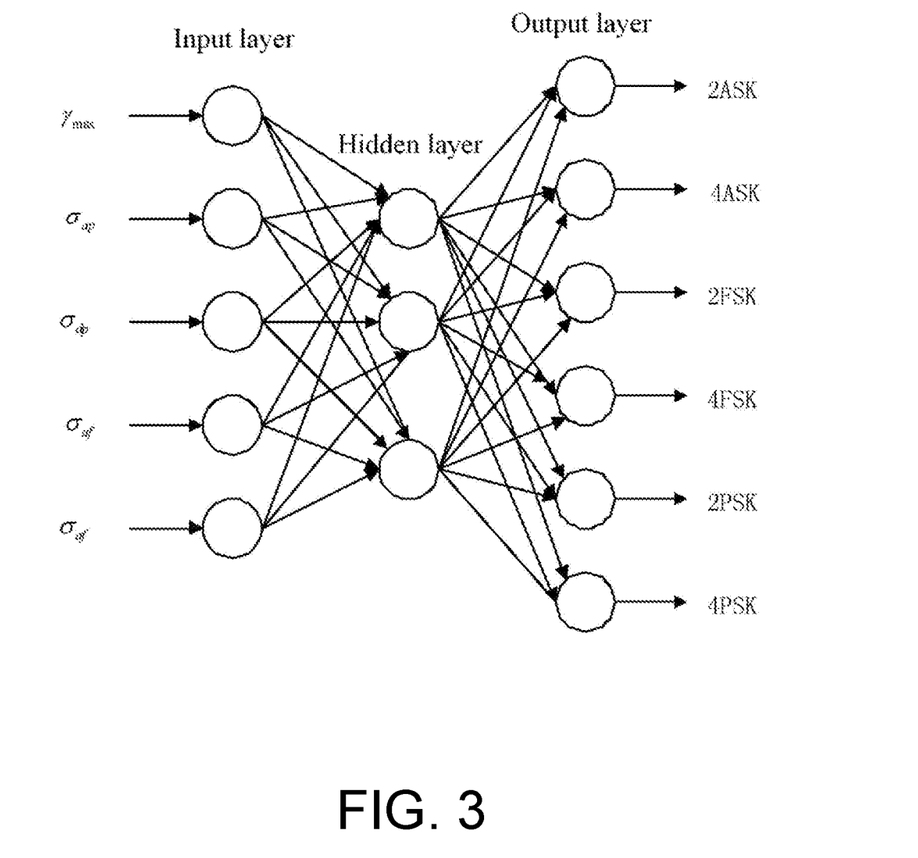
FIG. 3 is a diagram of a BP neural network in the method for automatically identifying a modulation mode for a digital communication signal according to the present invention.

S33. Training a three-layer BP neural network called as a weak classifier for each sampling set D$_t$, wherein, a column vector input is used for an input of the network, i.e., $x_i = [\gamma_{max_i}, \sigma_{ap_i}, \sigma_{dp_i}, \sigma_{aa_i}, \sigma_{af_i}]^T$, and a column vector output is used for an output of the network, i.e., y$_i$, so as to obtain the weak classifier corresponding to each sampling set, and a decision function is h$_t$(x); as an example, FIG. 3 shows the BP neural network constructed and used in the example; the network is composed of an input layer, a hidden layer and an output layer; the input layer comprises five neurons, the hidden layer comprises three neurons, and the output layer comprises six neurons.

Figure 4:
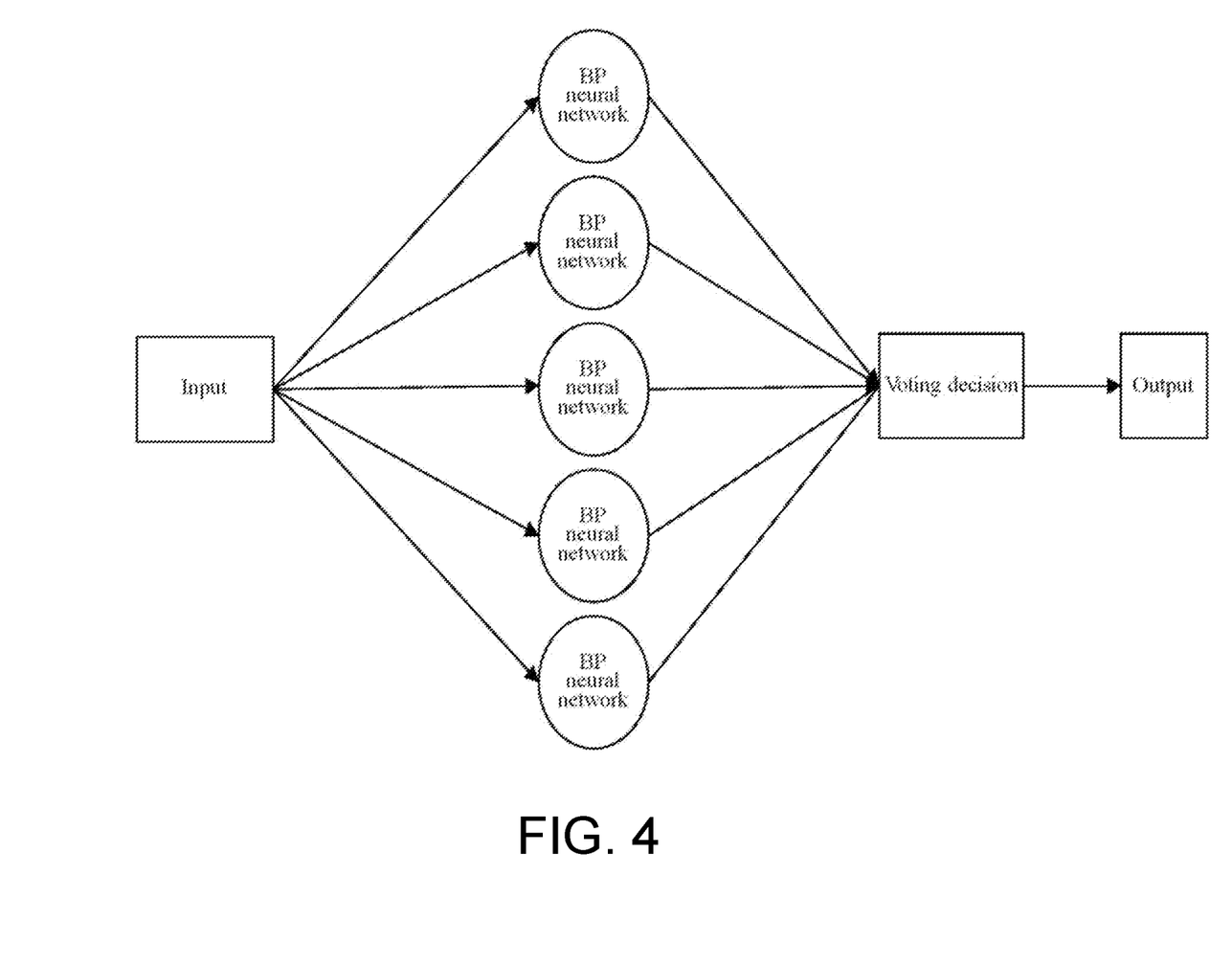
FIG. 4 is a diagram of the strong classifier in the method for automatically identifying a modulation mode for a digital communication signal according to the present invention.

S34. As shown in FIG. 4, obtaining the strong classifier by combining the weak classifiers, wherein an overall decision function is:

$$H(x) = \underset{y \in Y}{\operatorname{argmax}} \sum_{t=1}^{5} I(h_t(x) = y),$$

wherein x is an input vector, y is an output vector, I(•) is an indicator function, when • is true and false, values 1 and 0 are respectively taken, and h (x) is a decision function corresponding to each weak classifier.

S4. Testing the model, wherein a digital modulation signal to be tested is preprocessed firstly and a corresponding characteristic value is extracted, and then the characteristic value is inputted into the strong classifier in the step 3 to classify and identify the modulation mode; when a predicted output of each weak classifier is combined, a simple voting method is used to obtain a classification result by a rule that the minority obeys the majority.

The BP neural network used in the present invention has a training method for a self-adaptive modulation learning rate, and the digital signal modulation mode is fully used to identify five commonly used characteristic values as the input of the strong classifier. All the characteristic values are used in each decision instead of using only one characteristic value. Compared with the traditional method of using one characteristic quantity to make decision, a success rate of identification is mainly related to the overall performance of the characteristic. Meanwhile, for the same training data, a plurality of BP neural networks are trained as the weak classifiers by Bagging, and the strong classifier is formed by these weak classifiers. Therefore, the modulation mode has a higher success rate of identification.

The specific embodiment described above is merely the optimal implementation of the invention, but is not used to limit the protection scope of the invention, and any equivalent structure or equivalent flow transformation made by using the spirit and principle of the invention and the contents of the drawings shall be included in the protection scope of the invention.

What is claimed is:

1. A method for automatically identifying a modulation mode for a digital communication signal, the method comprising the following steps of:
    S1: preprocessing a training digital modulation signal, wherein the preprocessing of the training digital modulation signal comprising: estimating a bandwidth and a carrier frequency of the training digital modulation signal, performing band-pass filtering on the training digital modulation signal, and converting a frequency of the digital modulation signal to a frequency band;
    S2: extracting a characteristic value of the training digital modulation signal, wherein the extracting of the characteristic value of the training digital modulation signal comprising: extracting a signal time domain characteristic from the digital modulation signal through data provided by preprocessing in the step S1;
    S3: training a model, wherein the training of the model comprising: training a strong classifier, training five weak classifiers based on a backpropagation (BP) neural network by using a column vector composed of the characteristic value as an input through bootstrap aggregating (Bagging) concurrent integrated learning, and then combining the weak classifiers into the strong classifier, wherein $x_i = [\gamma_{max_i}, \sigma_{ap_i}, \sigma_{dp_i}, \sigma_{aa_i}, \sigma_{af_i}]^T$, is the column vector composed of the characteristic value, i=1 to 1000, and x$_i$ belongs to an i$^{th}$ input column vector composed of the characteristic values; and
    S4: testing the model, wherein the testing of the model comprising: preprocessing a modulation signal to be tested firstly and extracting five characteristic parameters which are respectively a maximum value $\gamma_{max}$ of a normalized center instantaneous amplitude spectrum, a standard deviation $\sigma_{ap}$ of an absolute value of a nonlinear component of an instantaneous phase of a zero-center non-weak signal segment, a standard deviation $\sigma_{dp}$ of the nonlinear component of the instantaneous phase of the zero-center non-weak signal segment, a standard deviation $\sigma_{aa}$ of an absolute value of a zero-center normalized instantaneous amplitude, and a standard deviation $\sigma_{af}$ of an absolute value of an instantaneous frequency of a zero-center normalized non-weak signal segment, and then inputting the characteristic parameters into the column vector to classify and identify the modulation mode; when combining a predicted output of each weak classifier, obtaining a classification result by majority rule.

2. The method for automatically identifying a modulation mode for a digital communication signal according to claim 1, wherein the training of the strong classifier in the step S3 specifically comprises: setting a data set $G=\{(x_1,y_1), \ldots, (x_{1000}, y_{1000})\}$ containing 1000 training samples firstly, wherein $y_i$ belongs to one column of the following matrix $$Y = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

a first column represents a 2 amplitude-shift keying (2ASK) modulation mode, a second column represents a 4ASK modulation mode, a third column represents a 2 frequency-shift keying (2FSK) modulation mode, a fourth column represents a 4FSK modulation mode, a fifth column represents a 2 phase-shift keying (2FSK) modulation mode, and a sixth column represents a 4PSK modulation mode; then sampling five sampling sets $D_i$ containing 1000 training samples, and training a three-layer BP neural network as a weak classifier for each sampling set $D_i$, a corresponding decision function being $h_t(x)$, wherein the BP neural network is composed of an input layer, a hidden layer and an output layer; and finally combining five weak classifiers based on the BP neural network into the strong classifier by combining the weak classifiers, an overall decision function of the strong classifier being:

$$H(x) = \underset{y \in Y}{\operatorname{argmax}} \sum_{t=1}^{5} I(h_t(x) = y),$$

wherein x is an input column vector composed of the characteristic values, Y is an output vector, I(•) is an indicator function, when • is true and false, values 1 and 0 are respectively taken, and $h_t(x)$ is a decision function corresponding to each weak classifier.

3. The method for automatically identifying a modulation mode for a digital communication signal according to claim 2, wherein more than 1000 training samples are provided.

4. The method for automatically identifying a modulation mode for a digital communication signal according to claim 1, wherein after preprocessing the modulation signal to be tested firstly and extracting the corresponding characteristic parameter in the step S4, the characteristic parameter is inputted into the strong classifier in the step S3 to classify and identify the modulation mode.

* * * * *